April 18, 1967    O. WOLFF ETAL    3,314,448
SEQUENTIALLY OPERATED PLURAL VALVE FOR VACUUM INSTALLATION
Filed Feb. 27, 1964    5 Sheets-Sheet 1

Inventors,
Otto Wolff &
Emil Hentschel.

Inventors.
Otto Wolff &
Emil Hentschel

Inventors.
Otto Wolff,
Emil Hentschel.

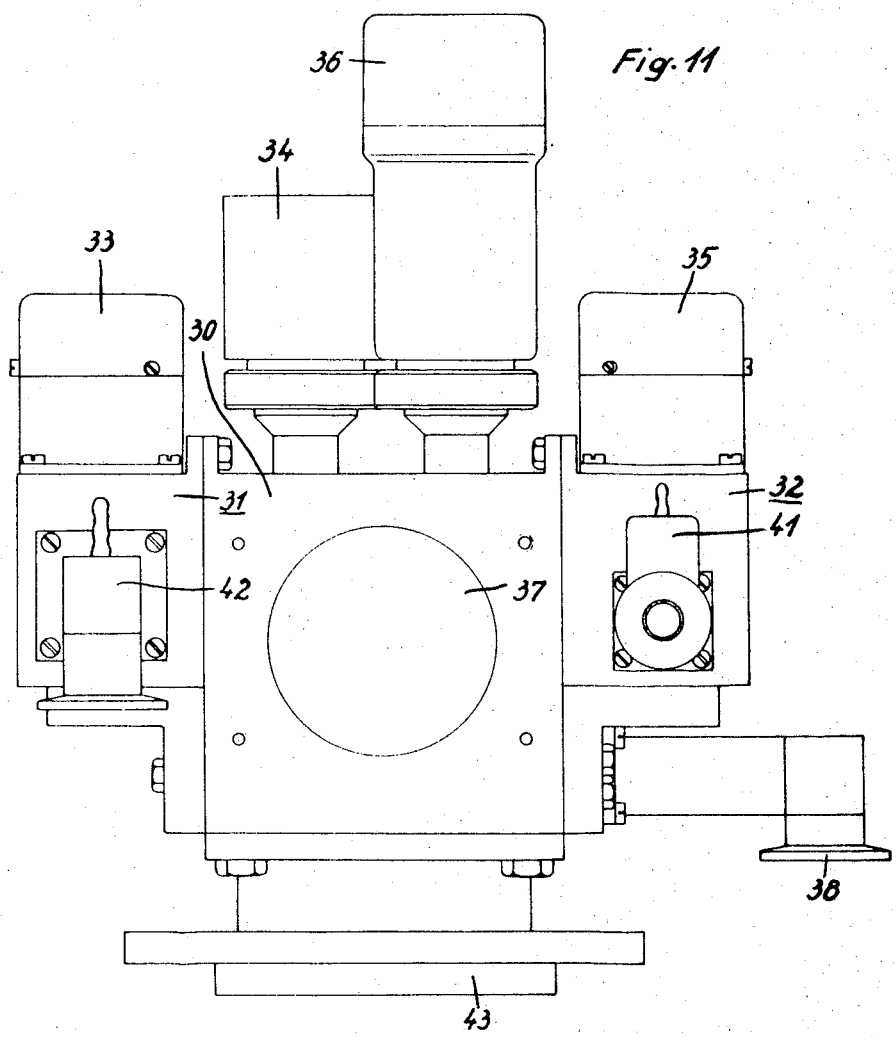

United States Patent Office 3,314,448
Patented Apr. 18, 1967

3,314,448
SEQUENTIALLY OPERATED PLURAL VALVE
FOR VACUUM INSTALLATION
Otto Wolff and Emil Hentschel, Berlin, Germany, assignors to Siemens & Halske Aktiengesellschaft Berlin and Munich, a corporation of Germany
Filed Feb. 27, 1964, Ser. No. 347,954
Claims priority, application Germany, Feb. 28, 1963,
S 83,953
16 Claims. (Cl. 137—627.5)

The invention is directed to a valve for use in vacuum systems, especially as a prevacuum valve for the vacuum system of corpuscular radiation devices, such as electron microscopes. It can, however, also be used in other devices where a controlled pumping operation is necessary for the removal of gases or gas mixtures, such as air.

Known valves of this type employ two chambers tightly sealable with respect to one another by means of a valve plate operable over a valve stem. One of such chambers is connected with a source of lower pressure, for example a vacuum pump, and the other chamber is connected with a space of higher pressure, which is designated in the following as the receiver. The term "receiver" is to be understood as designating, within the scope of the invention, not only the vessel to be evacuated, for example, an electron microscope, but other parts as well, such as pipe lines or the like, in which may exist a higher pressure than in the areas connected with the other chamber.

The invention relates to a valve for vacuum systems employing chambers which may be sealed, vacuum-tight, from one another in which one chamber communicates with an area of lower pressure, for example a vacuum pump, and another chamber communicates with an area of higher pressure, such as a receiver, especially a prevacuum valve for the vacuum system of corpuscular radiation devices such as electron microscopes. The purpose of the invention is to provide a valve construction for vacuum installations of the type described, which offers a number of favorable possibilities, both with respect to the manner of functioning of the valve and also with respect to the operation of the whole vacuum system. The problem is solved by a valve of the type described, with the characterizing feature that a third chamber is provided, such third chamber being so arranged with respect to the two first-mentioned chambers that the latter chambers abut on a common wall of the third chamber, in which openings are provided serving for the connection of the chambers. A valve member provided with suitably formed sealing means is operatively disposed in the third chamber and is movable by means of a valve stem relative to the common wall in such a way that all the openings can be closed vacuum-tight by the single valve member.

Insofar as valves with three chambers have heretofore been known, they lack both the feature according to the invention of the particular arrangement of the three chambers with relation to one another and the use of only a single valve member. In the prior arrangement, the third chamber is bounded by two valve members, each movable in one of the two other chambers. The number of sealing means required is thereby increased and the danger of the leakage of undesired gases and vapors into the devices connected to the valve is correspondingly greater.

In a particularly advantageous form of the invention, the openings lie in a plane perpendiclar to the direction of movement of the valve plate.

It is possible to reduce the number of sealing surfaces and sealing means provided on the valve member by arranging the two first-mentioned chambers coaxially to one another, in which arrangement the outer chamber has an opening of continuous configuration, preferably annular, which surrounds the opening in the inner chamber of the two. The valve member in this construction is provided with a sealing means which is shaped to correspond to that of the opening. The valve member in this construction, is provided with a packing which is shaped to correspond to that of the opening, for the mutual vacuum-tight closure of both of the chambers with respect to one another and also with respect to the third chamber.

The design of the valve as a three-chamber valve, according to the invention, offers the advantage of using the third chamber as a drain or lock chamber. Means are provided which, before the breaking of the mutual vacuum-tight seal by the lifting of the valve member, accomplishes an evacuation or degassing of the drain chamber. This may be desirable, for example if within the valve any substances are present as, for example, packing material, grease or the like, and it is desired to prevent these substances from entering the receiver. Further, it is possible that, in the event of incomplete sealing air will penetrate into the third chamber, which, in the construction according to the invention, is drawn off before the receiver is connected, by lifting of the valve member, with the associated connection, for example, the vacuum pump.

The advantages of a design according to the invention is not, however, limited to the hazard-free elimination of gases or gas mixtures, such as air, that have entered in an undesirable manner. According to a further development of the invention, means are associated with the drain chamber, which, following the establishment of the mutual vacuum-tight closure when the valve member is in its closed position effect a venting of the drain chamber. This venting of the drain chamber after the placement of the valve member makes it possible, for example, to use atmospheric pressure or another pressure for urging the valve member into sealing position with respect to the two first-mentioned chambers. It is then unnecessary to assure a firm seating of the valve member by mechanical means as, for example, by means of cams or the like, or, in the case of a magnetic valve by electrical energy, and, particularly in cases where there is a very slight difference between the pressure in the receiver and the pressure in the chamber communicating with an area of lower pressure. Since the pressure in the drain chamber can again be lowered before the lifting of the valve member, the means serving for the operation of the valve member can be of relatively light construction.

The valves can be operated by mechanical means as well as by electrical means. While the invention will be described in connection with a magnetically actuated valve in which the valve stem is connected with the armature of the magnet system, it is merely for illustrative purposes and is not intended as a limitation of the invention to a magnetic valve.

The design of the third chamber as a drain chamber—that is, with a possibility of venting—provides expediently a valve stem composed of two parts. The one part serves for the venting of the drain chamber and has one of its ends securely connected with the armature. One end of the other part, serving for the operation of the valve member, however, is rigidly connected with the valve member. Consequently, the first-mentioned part directly follows the armature movement, while the second-mentioned part moves with the valve member.

The other end of the part serving for the venting of the drain chamber is provided, in a preferred form of the invention, with at least one evacuation channel. Such end extends, dependent on the excitation of the magnetic system, either with the venting channel inoperative, or extends sufficiently through the valve member into the chamber of lower pressure, that the evacuation channel, through connection of the drain chamber with the chamber of lower pressure, effects the evacuation of the drain chamber.

Accordingly, the other end of the valve stem part serving for the operation of the valve member is resiliently connected with the armature in such a way that in the event of an excessive pressure in the drain chamber in the position of the armature corresponding to the raised or open position of the valve member, the valve member is lifted off only when, by means of the valve stem part serving for the evacuation of the drain chamber, a complete or partial pressure compensation has taken place. Thus the invention provides a pressure-dependent operation of the valve member.

Constructionwise, the two-part valve stem can advantageously be so designed that part of the valve stem serving for the operation of the valve member, surrounds the part serving for the venting in the manner of a sleeve.

For the purpose of venting the drain space after the seating of the valve member, it is proposed that one end of a vent stem be resiliently connected with the armature in such a manner that its other end, provided with at least one venting channel which, dependent on the excitation of the magnetic system, is either inoperative or sufficiently extends from the valve casing that such venting channel connects the drain chamber with the exterior, to effect a venting of the drain chamber. It is advantageous to provide that when the position of the armature corresponds to the seated position of the valve member, the vent stem is moved under the action of a spring into a venting position, only following the full seating of the valve member. This design of the valve, through which a venting of the drain chamber, prior to the vacuum-tight closure of the three chambers with respect to one another, is definitely avoided, can be achieved in a simple manner by utilization of the friction forces between the vent stem and its packing or gasket. The spring characteristics should therefore be selected to provide suitable functional action between the vent stem and the packing serving for the vacuum-tight sealing of the vent stem with respect to the valve casing.

In order to achieve, as rapidly as possible, evacuation and venting of the drain chamber, there are arranged venting channels in parts contained in this chamber, particularly in the armature.

The use of the vent stem offers the further advantageous possibility of operating a switch whereby the switch can serve, as desired, for the generation of a signal or for influencing the energization of the magnet system, as, for example for switching over from an actuating circuit to a holding circuit.

Further advantages of a valve according to the invention will be apparent from the following description and drawings wherein:

FIG. 11 is a side elevational view of the assembly of FIG. 10.

Figure 1:
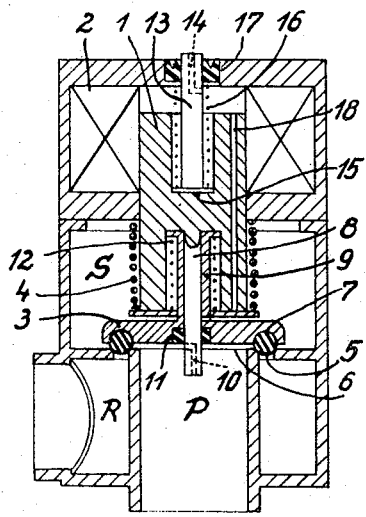
FIG. 1 is a schematic figure of a valve structure illustrating the operating elements in closed or sealing position.
Figure 2:
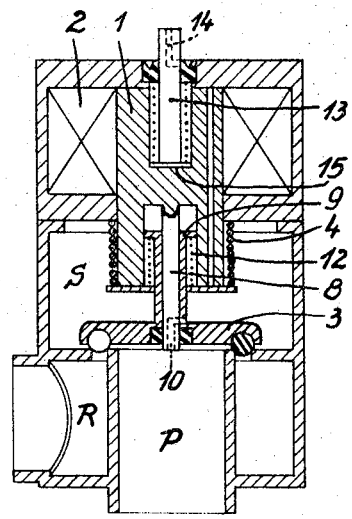
FIG. 2 is a similar figure illustrating the operating elements immediately following energization of the magnetic circuit and the armature in actuated position.
Figure 3:
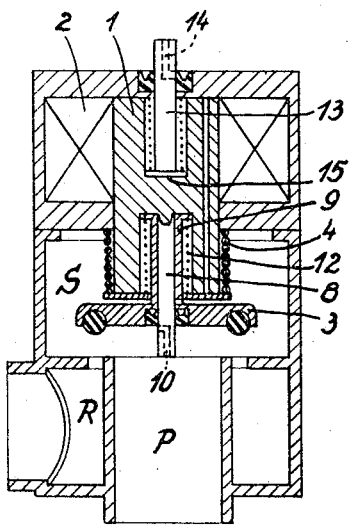
FIG. 3 illustrates the valve in fully opened position.
Figure 4:
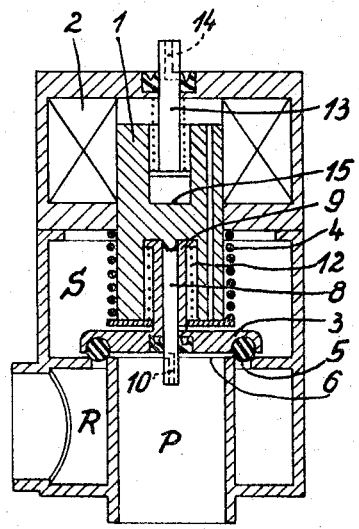
FIG. 4 illustrates the valve following deenergization of the magnetic circuit.

In FIGS. 1 to 4 the manner of operation of the valve according to the invention is schematically represented. Illustrated is a magnetic valve, whose armature 1, according to the excitation of the magnetic system, that is, on the energization of the actuating coil 2, is in a lower position as illustrated in FIGS. 1 and 4, or in an upper position as illustrated in FIGS. 2 and 3. In the examples illustrated, the armature 1, with the magnetic system energized, is disposed in the position for effecting actuation of the valve member 3 to a raised position, while with the magnetic system deenergized, it is urged downwardly by the spring 4.

Before further details are described, the arrangement of the valve chambers should be briefly described. The two chambers to the connected or sealed vacuum-tight with respect to each other are designated as R and P, chamber R representing the chamber connected with the receiver, which is not illustrated in the figures, and chamber P representing the chamber communicating with a point of lower pressure, for example, a vacuum pump.

In addition to the two first-mentioned chambers, the valve, according to the invention, is provided with a third chamber S, which is designed as a drain or lock chamber. It is apparent that the two first-mentioned chambers R and P are arranged coaxially to one another, and the outer chamber R has in a plane perpendicular to the direction of movement of the valve member 3 an opening 5 which, in the embodiment illustrated, is of annular configuration, and surrounds the opening 6 in the inner chamber P. It is thereby possible for the valve member 3 to simultaneously achieve the mutual vacuum-tight closure of all three chambers with the single sealing member or packing 7 shaped to correspond to the opening 5. Obviously it also is possible to use other sealing means.

In the third chamber S, which forms a drain chamber, is disposed means which, prior to the raising of the valve plate 3 accomplishes an evacuation or de-gassing of the drain chamber S. For this purpose the valve stem consists of two parts 8 and 9, of which the part 8 serving for the evacuation of the drain chamber S is rigidly connected at its upper end with the armature 1 of the magnetic system of the valve, while the part 9 of the valve stem serving for the operation of the valve member 3 is rigidly connected with the latter.

The other end of the part 8 is provided with one or more evacuation passageways 10, which end of part 8, following energization of the magnetic system, but prior to opening movement of the valve member 3, is so disposed with respect to the chamber P that the passage 10 connects the drain chamber S with chamber P effecting the evacuation of the drain chamber S, as illustrated in FIG. 2, or the evacuation channel 10 is inoperative as illustrated in FIGS. 1 and 4.

The arrangement thus far described functions as follows:

In FIG. 1, the valve member 3 is in its seated, closed position. All three chambers are sealed vacuum-tight from one another and the magnetic system is not energized. In FIG. 2 the valve member 3 remains in its seated position, but, as a result of the energization of the magnetic system, the armature 1 has moved into the upper position for the ultimate raising of the valve member 3. It has, in the process, carried along the part 8 of the valve stem, so that its other end does not protrude as far into the chamber P as illustrated in FIG. 1. As a consequence the evacuation channel 10 becomes operative, creating a connection between the drain chamber S and the chamber P. It was previously inoperative as both of its ends were disposed in the chamber P or adjacent the packing 11.

It is apparent that in contrast to part 8, the sleevelike part 9 of the valve stem, whose lower end is rigidly connected with the valve member 3 remains in its original position. Under the influence of the spring 12 it is brought into its upper position, represented in FIG. 3, only when a sufficient equalization has taken place between the pressures in the chambers S and P over the evacuation channel 10. It can be seen that the spring 12 can be so dimensioned that the movement of part 9 takes place either when pressure equalization is achieved or else at a predetermined pressure differential and thereafter permits the raising of the valve member 3. The rapidity of the pressure balancing can be influenced by a suitable proportioning of the diameter and configuration of the evacuation channel 10.

FIG. 3 illustrates the open position of the individual elements with an energized magnetic system. In the case of deenergization of the magnetic system the respective elements resume their original position as illustrated in FIG. 4.

The armature 1, at the upper portion of the structure, also actuates the vent stem 13, whereby the end having the channels 14, present in suitable number, projects exteriorly of the casing to a degree dependent on the energization of the magnetic system. The vent stem 13 is brought into its upper position, indicated in FIGS. 2, 3 and 4, directly by the armature 1 through surface 15, and moves, with armature 1 to its lower position under the influence of spring 16, in opposition to the frictional force exerted by its packing 17. As a result, as is apparent in FIG. 1, the venting channel 14 connects the drain chamber S with the exterior and thereby places this chamber under the external pressure, only after the seating of the valve member 3 has effected the mutual vacuum-tight closure of the chambers P, R and S. As the chamber S, after seating of valve member 3 is under atmospheric pressure, or another suitably selected external pressure, the closure of the three chambers with respect to one another by the packing 7, is reliably assured.

Although the valve is therefore operative under the full pressure differential between the exterior and the pressure in the chamber P, connected, for example, with a vacuum pump, as the evacuation of the drain chamber S is made possible by means of the two parts 8 and 9 of the valve stem, an increase of the force required for the operation of the valve is advantageously avoided.

Figures 5, 6:
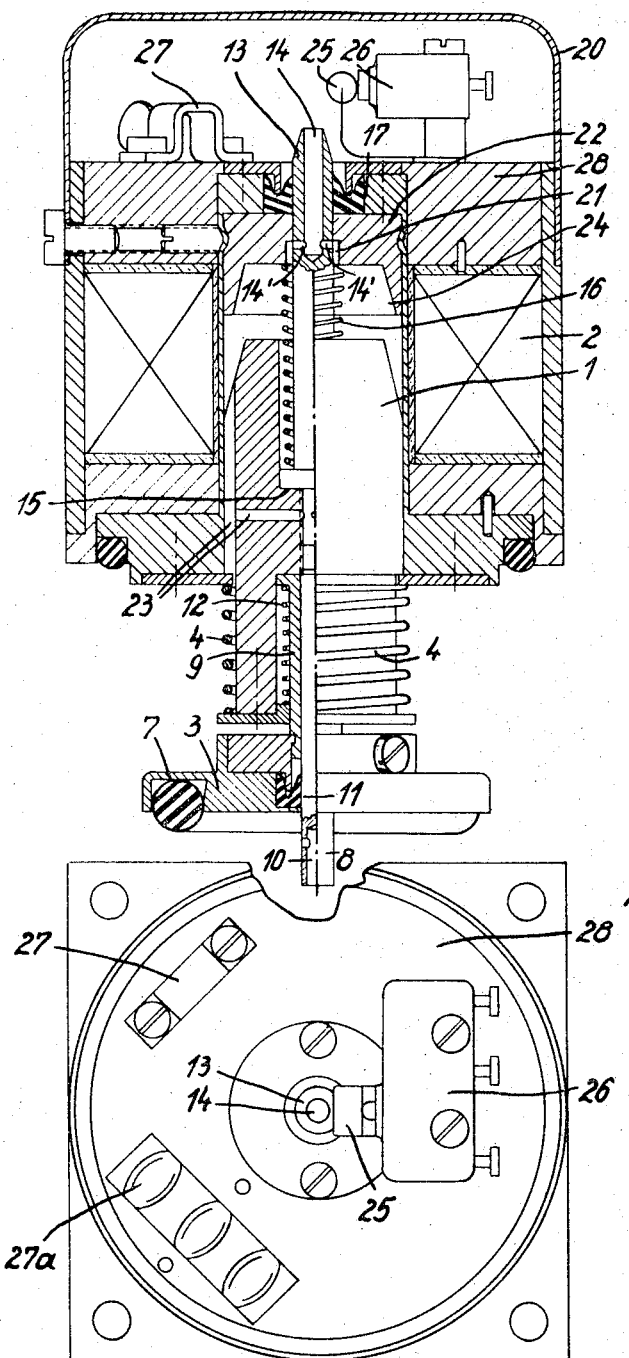
FIG. 5 is a similar figure of production valve construction embodying the invention.
FIG. 6 is a plan view of the construction illustrated in FIG. 5, with the housing cap removed.

While FIGS. 1 to 4 serve schematically to explain the manner of operation of an example of the valve according to the invention, FIGS. 5 and 6 illustrate a practical construction of such a valve. FIG. 5 shows, essentially, a central section in axial direction, while FIG. 6 illustrates a plan view with the cap 20 removed. The parts present in FIGS. 1 to 4 are provided with the same reference symbols.

In FIG. 5 there is illustrated an operating position of valve member 3, armature 1 and vent stem 13 corresponding to FIG. 1. In this embodiment the vent stem has an axially extending venting channel 14 with several radial outlets 14′, which by means of a corresponding recess or depression 21 in the molded part 22 in the position shown accomplish the venting of the drain chamber S, not illustrated. For the acceleration of this venting the armature 1 has passageways 23 for the discharge of the air. Obviously, as is indicated in FIGS. 1 to 4 by the reference number 18, it can have bores running substantially in an axial direction.

The travel of the armature 1 is limited at its upper end by engagement of its conical outer surface with the conical counterbore 24 in the molded part 22.

In the embodiment illustrated in FIGS. 5 and 6, the vent stem 13 also fulfills a further function. When it reaches its upper position, illustrated in FIG. 7, it operates, by means of the roller 25, a switch 26 which, as well as the cable clips 27 and the soldering tabs 27a for the connecting lines to the magnetic system, is mounted on the closure plate 28. This switch may serve the purpose of initiating a desired signal or an operation. It is also possible, however, to simultaneously or optionally, use it to control the energization of the magnetic system, for example, whereby it effects a switch-over from an actuation circuit to a holding circuit.

Figure 7:
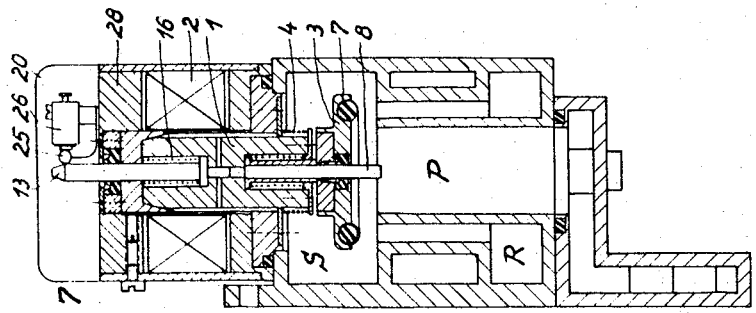
FIG. 7 illustrates, in vertical section, the operative mounting of the valve construction illustrated in FIGS. 5 and 6, on a valve block structure.

The functions of the other parts of the valve according to FIG. 7 are believed apparent from a reference to FIGS. 1 to 4.

Figure 8:
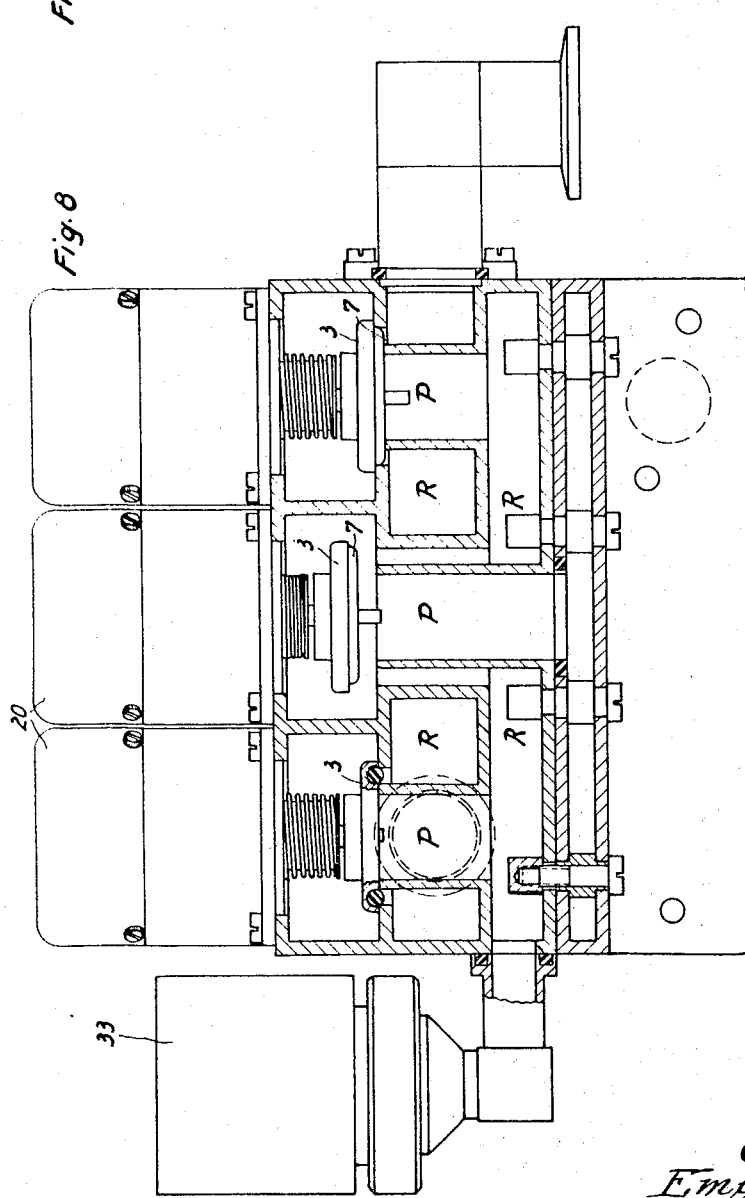
FIG. 8 illustrates an elevational view of a valve block structure such as illustrated in FIG. 7.

FIG. 7 illustrates a design modification of chambers R, P and S as illustrated in FIGS. 1 to 4. This form of valve, as specifically illustrated in FIG. 8, is particularly adapted for use in the frame of a valve block. It is a known practice, for example, in vacuum systems for electron microscopes, to group together into a block the various valves in a modular form. The individual valves have separate casings detachably connected with one another, which have openings sealed vacuum-tight against the exterior, for effecting the necessary connections.

As a result of the compact construction, achieved especially by the coaxial arrangement of the two chambers P and R, the valve according to the invention is especially well suited for use in such a valve block. In this connection, it is especially suitable for use as a prevacuum valve.

The described design of the chambers of the valve makes possible however, in addition, another desirable construction of the valve block, namely such that the chambers of the one valve disposed in communication with an area of lower pressure forms the chamber of the adjoining valve disposed in communication with an area of lower pressure or the chamber disposed in communication with the receiver. Thus, as represented in FIG. 8, the chamber R of the middle valve is identical with the chamber P both of the left-hand and also of the right-hand neighboring valves. It is possible, therefore, in an advantageous manner, to produce a three-chamber valve block by assembly of several valves without the necessity of providing a separate casing for each valve. The angular disposition of the individual chambers, such as illustrated in FIG. 7, is especially favorable.

Figure 9:
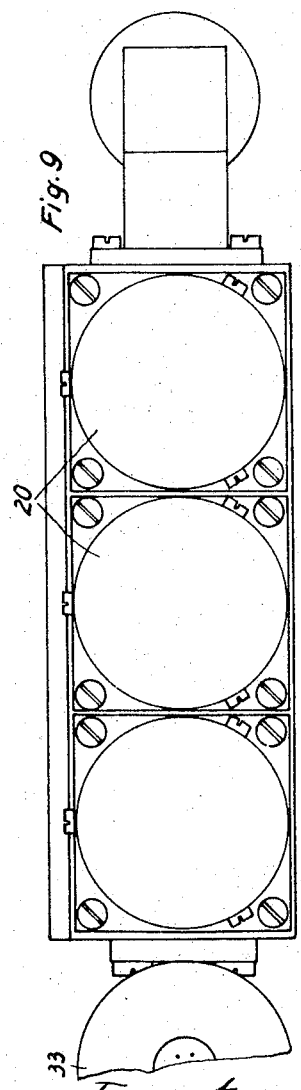
FIG. 9 is a plan view of the valve block structure illustrated in FIGS. 7 and 8.

In FIG. 9 there is illustrated a plan view of the arrangement shown in FIG. 8. The simple construction of this valve block is believed apparent from three individual valves according to the invention.

Figure 10:
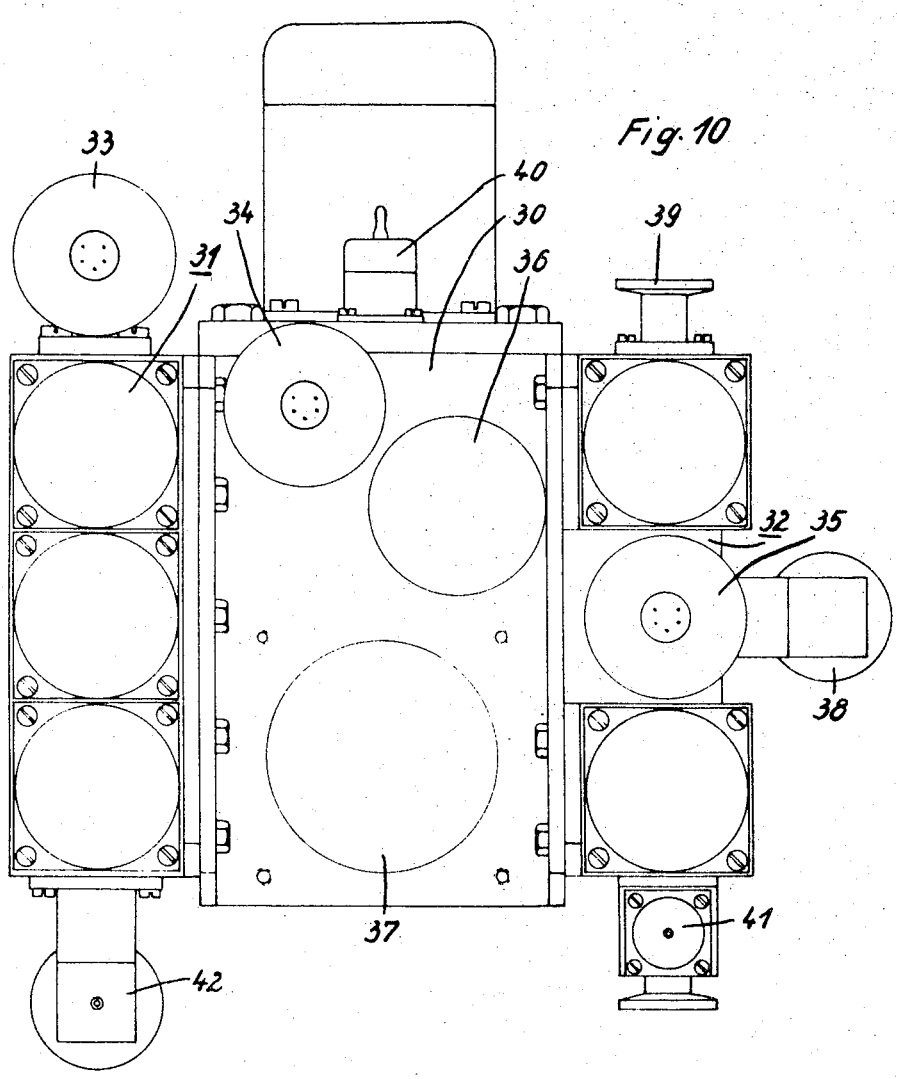
FIG. 10 is a plan view of an assembly of valve blocks such as illustrated in FIGS. 7–9.

The space-saving construction of the valve block according to FIG. 9 also offers in a simple manner the possibility of creating a larger valve block assembly out of several of the blocks described, if desired with the addition of another valve system. This is represented in FIGS. 10 and 11.

On the two long side faces of a valve assembly 30 forming a main-chamber serving, for example, as a high-vacuum valve, there are mounted two blocks of valves 31 and 32, constructed according to the invention, as heretofore described, with block 31 being identical to that illustrated in FIGS. 7 to 9. The numerals 33, 34 and 35 designate the prevacuum measuring tubes, while 36 designates a high-vacuum measuring tube. The openings 37 form the connections for the receiver, for example, an electron microscope, while the connecting nipples 38 and 39 are prevacuum connections 40, 41 and 42 are venting valves, and 43 is the connection for the high-vacuum pumps.

The invention is not limited to the example of construction illustrated in the drawings. It may be desirable, in particular cases, to use other than the illustrated forms of the chambers. In all cases, however, use is made of the inventive feature of the provision of three valve chambers which, as shown and described, presents a considerable number of advantages.

Changes may be made within the scope and spirit of the appended claims which define what is believed to be new and desired to have protected by Letters Patent:

We claim:

1. Magnetic valve for vacuum systems, such as a pre-vacuum valve for vacuum systems of corpuscular radiation devices like electron microscopes, comprising a valve body formed with a chamber communicating with an area of lower pressure such as a vacuum pump, a chamber communicating with an area of higher pressure, and a lock chamber having a wall in common with and abutted by the other chambers, said wall being formed with valve openings affording communication between said first-mentioned two chambers through said lock chamber; a valve member, preferably having suitably shaped sealing means thereon, disposed in said lock chamber; a valve stem associated with said valve member; magnetic actuating means for actuating said valve stem and said valve member therewith to move relative to said common wall so as to seal all of said valve openings in vacuum-tight relation; and means associated with said lock chamber for connecting said lock chamber to atmosphere after said valve member has vacuum-tightly sealed said valve openings.

2. Magnetic valve according to claim 1, characterized by the feature that said valve openings lie in a plane perpendicular to the direction of movement of the valve member.

3. Magnetic valve according to claim 1, characterized by the feature that the two first-mentioned chambers are arranged coaxially to each other, the outermost of said two chambers having an opening closed in itself, preferably an opening of annular shape, which surrounds the opening of the inner one of said two chambers, with the valve member being provided for the mutual vacuum-tight closure of the chambers with sealing means correspondingly shaped to the configuration of said annular opening.

4. Magnetic valve according to claim 1, characterized by means, operable before the breaking of the mutual vacuum-tight seal by the lifting and unseating of the valve member, for effecting an evacuation or de-gassing of the drain chamber.

5. Magnetic valve according to claim 4, characterized by a magnetic system including magnetic field producing means and an armature displaceable thereby, said valve stem being connected to the armature of the magnetic system.

6. Magnetic valve according to claim 5, characterized by the feature that said valve stem consists of a part whose one end is rigidly connected to the armature, and forms said means for the evacuation of the drain chamber, and a part serving for the actuation of the valve member, one end of which is rigidly connected with the valve member.

7. Magnetic valve according to claim 5, characterized by the feature that one end of a vent stem is resiliently connected with the armature and its other end is provided with at least one venting passage, said vent stem being disposed upon energization of the magnetic system, to render said venting passage inoperative, and being operative to vent said drain chamber to the exterior of the valve body when said magnetic system is deenergized.

8. Magnetic valve according to claim 6, characterized by the feature that the part of the valve stem serving for the actuation of the valve member surrounds the part serving for the venting in the form of a sleeve.

9. Magnetic valve according to claim 6, characterized by the feature that the other end of the part serving for the venting is provided with at least one vent channel, and, following actuation of the valve member, in dependence upon the excitation of the magnetic system, protrudes through the valve member into the chamber connected with an area of lower pressure, whereby the venting channel is inoperative in one position and in another position connects the drain chamber with the chamber communicating with an area of lower pressure to effect a venting of the drain chamber.

10. Magnetic valve according to claim 9, characterized by the feature that the other end of the part serving for the actuation of the valve member is resiliently connected with the armature, that with an excess pressure in the drain chamber at the position of the armature corresponding to the position of the valve member, the latter is raised only when a pressure compensation has taken place through the part serving for the venting of the drain.

11. Magnetic valve according to claim 7, characterized by the feature that said venting stem is spring biased toward its venting position, and following deenergization of said magnetic system, is movable into such venting position only following a seating of said valve member in its closed position.

12. Magnetic valve according to claim 7, characterized by the feature that the armature is provided with at least one venting passage.

13. Magnetic valve according to claim 7, characterized by the feature that switching means is provided co-operable with the outer end of said valve stem, whereby said venting stem is operative upon energization of said magnetic system to actuate said switch, for example, for effecting a switch-over from energizing current to holding current.

14. Magnetic valve according to claim 11, characterized by the feature that a sealing packing is provided for said venting stem which is operative to frictionally retard the movement of said venting stem toward its venting position.

15. Magnetic valve according to claim 1, characterized by the utilization of a plurality of said valves in combination with a valve block in which the respective valve structures are detachably mounted.

16. Magnetic valve according to claim 1, characterized by the feature that several valve structures are so arranged on a valve block that the chamber of one valve communicating with a space of lower pressure forms the chamber communicating with a space of lower pressure or the chamber communicating with the receiving space for the adjacent valve.

References Cited by the Examiner

UNITED STATES PATENTS

| | | | |
|---|---|---|---|
| 683,691 | 10/1901 | Kramer | 137—630.13 X |
| 874,652 | 12/1907 | Bailey | 251 |
| 1,013,640 | 1/1912 | Bryon | 137—630.17 |
| 1,152,291 | 8/1915 | Carson | 137—630.17 |
| 2,217,141 | 10/1940 | Sprenkle | 137—629 X |
| 2,299,649 | 10/1942 | Paille | 137—630.16 X |
| 2,413,622 | 12/1946 | Harding | 137—629 X |
| 2,655,936 | 10/1953 | Wexler | 251 |
| 3,076,630 | 2/1963 | Hammond | 137—630.15 X |
| 3,111,139 | 11/1963 | Beckett | 137—608 |
| 3,195,574 | 7/1965 | Carls | 137—608 X |

CLARENCE R. GORDON, *Primary Examiner.*